United States Patent
Pattnaik et al.

(10) Patent No.: US 10,955,576 B2
(45) Date of Patent: Mar. 23, 2021

(54) FULL WAVEFORM INVERSION OF VERTICAL SEISMIC PROFILE DATA FOR ANISOTROPIC VELOCITIES USING PSEUDO-ACOUSTIC WAVE EQUATIONS

(71) Applicant: Halliburton Energy Services, Inc., Houston, TX (US)

(72) Inventors: Sonali Pattnaik, Golden, CO (US); Amit Padhi, Houston, TX (US); Mark Elliott Willis, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 39 days.

(21) Appl. No.: 15/745,846

(22) PCT Filed: Aug. 17, 2017

(86) PCT No.: PCT/US2017/047428
§ 371 (c)(1),
(2) Date: Jan. 18, 2018

(87) PCT Pub. No.: WO2018/035370
PCT Pub. Date: Feb. 22, 2018

(65) Prior Publication Data
US 2020/0088895 A1 Mar. 19, 2020

Related U.S. Application Data

(60) Provisional application No. 62/377,235, filed on Aug. 19, 2016.

(51) Int. Cl.
*G01V 1/28* (2006.01)
*E21B 41/00* (2006.01)
(Continued)

(52) U.S. Cl.
CPC .......... *G01V 1/282* (2013.01); *E21B 41/0092* (2013.01); *E21B 44/00* (2013.01);
(Continued)

(58) Field of Classification Search
CPC .... G01V 1/282; G01V 1/303; E21B 41/0092; E21B 44/00
(Continued)

(56) References Cited

U.S. PATENT DOCUMENTS 4,926,393 A * 5/1990 McClellan ............... G01V 1/42
367/57
5,583,825 A * 12/1996 Carrazzone ............ G01V 1/306
367/31
(Continued)

OTHER PUBLICATIONS

US EPA Article Titled "Vercal Incidence VSP"—dated May 18, 2016. (Year: 2016).*
(Continued)

*Primary Examiner* — Iftekhar A Khan
(74) *Attorney, Agent, or Firm* — Haynes and Boone, LLP (57) ABSTRACT

High fidelity velocity models are generated for acoustic vertically transverse isotropic media by taking advantage of full-waveform based modeling using VSP data. The present disclosure determines VTI parameters in acoustic media using pseudo-acoustic equations which can eliminate the contribution from shear waves, and thus significantly reduce the time needed to perform inversion. The methods disclosed herein provide workflows for performing full waveform inversion to provide velocity models used to generate seismic images with high quality and resolution.

20 Claims, 7 Drawing Sheets

(51) Int. Cl.
E21B 44/00 (2006.01)
E21B 49/00 (2006.01)
G01V 1/30 (2006.01)

(52) U.S. Cl.
CPC ............ E21B 49/00 (2013.01); G01V 1/284 (2013.01); G01V 1/303 (2013.01); G01V 2210/161 (2013.01); G01V 2210/614 (2013.01); G01V 2210/626 (2013.01)

(58) Field of Classification Search
USPC ........................................................ 703/10
See application file for complete search history.

(56) References Cited

U.S. PATENT DOCUMENTS

| | | | | |
|---|---|---|---|---|
| 9,140,812 B2* | 9/2015 | Baumstein | | G01V 1/28 |
| 9,158,018 B2* | 10/2015 | Fuck | | G01V 1/301 |
| 9,702,998 B2* | 7/2017 | Bansal | | G01V 1/303 |
| 9,772,413 B2* | 9/2017 | Krohn | | G01V 1/005 |
| 10,054,714 B2* | 8/2018 | Denli | | G01V 1/282 |
| 10,386,511 B2* | 8/2019 | Routh | | G01V 1/003 |
| 2003/0151976 A1* | 8/2003 | Leaney | | G01V 1/42 367/38 |
| 2004/0093163 A1* | 5/2004 | Reshef | | G01V 1/303 702/14 |
| 2004/0199330 A1* | 10/2004 | Routh | | G01V 1/282 702/14 |
| 2006/0256651 A1* | 11/2006 | Sanders | | G01V 1/02 367/15 |
| 2008/0189043 A1* | 8/2008 | Anno | | G01V 1/308 702/14 |
| 2010/0088035 A1* | 4/2010 | Etgen | | G01V 1/30 702/16 |
| 2011/0007604 A1* | 1/2011 | Liu | | G01V 1/28 367/52 |
| 2012/0014217 A1* | 1/2012 | Houck | | G01V 1/308 367/72 |
| 2012/0073825 A1* | 3/2012 | Routh | | G01V 1/28 166/369 |
| 2012/0075954 A1* | 3/2012 | Xu | | G01V 1/36 367/38 |
| 2012/0259601 A1* | 10/2012 | Fuck | | G01V 1/301 703/2 |
| 2013/0060539 A1* | 3/2013 | Baumstein | | G01V 1/28 703/2 |
| 2013/0060544 A1* | 3/2013 | Bakker | | G01V 1/28 703/2 |
| 2013/0182538 A1* | 7/2013 | Lin | | G01V 1/282 367/53 |
| 2014/0119159 A1* | 5/2014 | Le Calvez | | G01V 1/44 367/25 |
| 2014/0358504 A1* | 12/2014 | Baumstein | | G01V 99/005 703/2 |
| 2014/0372044 A1* | 12/2014 | Jiao | | G01V 1/282 702/16 |
| 2015/0012251 A1* | 1/2015 | Horne | | G01V 1/306 703/2 |
| 2015/0032379 A1* | 1/2015 | Campbell | | G01V 1/362 702/14 |
| 2015/0293248 A1* | 10/2015 | Etgen | | G01V 1/303 702/16 |
| 2015/0301208 A1* | 10/2015 | Lewis | | G01V 1/282 702/14 |
| 2015/0346367 A1* | 12/2015 | Lambare | | G01V 1/303 367/73 |
| 2015/0362623 A1* | 12/2015 | Miotti | | G01V 11/00 702/14 |
| 2016/0047924 A1* | 2/2016 | Krohn | | G01V 1/282 703/2 |
| 2016/0131780 A1* | 5/2016 | Fuller | | G01V 1/42 702/6 |
| 2016/0139283 A1* | 5/2016 | Kamil | | G01V 1/364 702/17 |
| 2016/0187512 A1* | 6/2016 | Mothi | | G01V 1/303 702/6 |
| 2016/0291180 A1* | 10/2016 | Washbourne | | G01V 1/282 |
| 2017/0010373 A1* | 1/2017 | Ayeni | | G01V 1/282 |
| 2017/0184748 A1* | 6/2017 | Baydin | | G01V 1/36 |
| 2017/0212260 A1* | 7/2017 | Padhi | | G01V 1/306 |
| 2017/0248719 A1* | 8/2017 | Holman | | E21B 49/003 |
| 2018/0120464 A1* | 5/2018 | Sun | | G01V 1/48 |
| 2018/0356549 A1* | 12/2018 | Lou | | G01V 1/42 |
| 2019/0049612 A1* | 2/2019 | Padhi | | G01V 1/50 |

OTHER PUBLICATIONS

Warner et al. ("Anisotropic 3D full-waveform inversion", Geophysics, vol. 78, No. 2 (Mar.-Apr. 2013); p. R59-R80) (Year: 2013).*
Fletcher et al., "Reverse Time Migration in Tilted Transversely Isotropic (TTI) Media," *Geophysics*, Nov. 2009, vol. 74, No. 6.
Fowler et al., "Couple Equations for Reverse Time Migration in Transversely Isotropic Media," *Geophysics*, Jan. 2010, vol. 75, No. 1.
International Search Report and the Written Opinion of the International Search Authority, or the Declaration, dated Nov. 28, 2017, PCT/US2017/047428, 15 pages, ISA/KR.
Owusu et al., "Anisotropic Elastic Full-Waveform Inversion of Walkaway VSP Data From the Arabian Gulf," *EAGE Geophysical Prospecting*, Jan. 2016, vol. 64, Issue 1, pp. 38-53.
Plessix, "A Review of the Adjoint-State Method for Computing the Gradient of a Functional With Geophysical Applications," *Geophysical Journal*, Nov. 1, 2006, vol. 167, Issue 2, pp. 495-503.
Tromp et al., "Seismic Tomography, Adjoint Methods, Time Reversal and Banana-Doughnut Kernels," *Geophysical Journal International*, Jan. 1, 2005, vol. No. 160, Issue No. 1, pp. 195-216.

* cited by examiner

FIG. 7 ic # FULL WAVEFORM INVERSION OF VERTICAL SEISMIC PROFILE DATA FOR ANISOTROPIC VELOCITIES USING PSEUDO-ACOUSTIC WAVE EQUATIONS

PRIORITY

The present application is a U.S. National Stage Patent Application of International Patent Application No. PCT/US2017/047428, filed Aug. 17, 2017, which claims the benefit of U.S. Provisional Patent Application No. 62/377,235, filed on Aug. 19, 2016, the benefit of which is claimed and the disclosures of which are incorporated herein by reference in their entirety.

TECHNICAL FIELD

The present disclosure generally relates to anisotropy parameter determination and, more particularly, to generating high fidelity velocity models for acoustic vertically transverse isotropic media by taking advantage of full-waveform inversion based modeling using vertical seismic profile data.

BACKGROUND

Certain earth formations exhibit a property called "anisotropy", where the velocity of acoustic waves polarized in one direction may be somewhat different than the velocity of acoustic waves polarized in a different direction within the same earth formation. Anisotropy may arise from intrinsic structural properties, such as grain alignment, crystallization, aligned fractures, or from unequal stresses within the formation. Anisotropy is particularly of interest in the measurement of the velocity of seismic P-waves propagating in the earth formations. Subsurface formations are often anisotropic, meaning that the acoustic wave propagation speed depends on the direction in which the wave propagates. Typically, the formations, even when anisotropic, are relatively isotropic in the horizontal plane. This particular version of anisotropy is often called vertical transverse isotropic ("VTI"). Accurate seismic imaging requires that such anisotropy be accounted for during the migration portion of seismic data processing. VTI based models represent the conventional approach for anisotropic depth imaging in many areas, and prior knowledge of a vertical velocity ($V_{p0}$) and two anisotropy Thomsen parameters $\in$ and $\delta$ is essential to produce accurate depth image of P-wave seismic data. It may be noted here that alternative combinations of these parameters can also be used for creation of such depth images and hence $V_{p0}$, $\in$, and $\delta$ may be substituted by other parameters obtained by reformulation of the definitions of these parameters.

Over the past several decades, seismic processing has gradually developed to allow for estimation of anisotropy parameters from seismic data. One such method is vertical seismic profile ("VSP") approach. However, conventional VSP processing methods like semblance or ray-based tomography do not exploit the full-data information and, hence, generate sub-optimal velocity models. The failure to exploit all the data is because semblance and tomography methods only utilize the kinematic information and ignore the dynamic (amplitude) information in the seismic data. This results in poor recovery of subsurface parameters which affects the reservoir characterization, modeling and, ultimately, production.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Illustrative embodiments and related methods of the present disclosure are described below as they might be employed in methods and systems for generating velocity models of a subsurface formation using pseudo-acoustic formulations. In the interest of clarity, not all features of an actual implementation or method are described in this specification. It will of course be appreciated that in the development of any such actual embodiment, numerous implementation specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, illustrative embodiments and methods of the present disclosure are applied to generate high fidelity velocity models for acoustic VTI media by taking advantage of full-waveform based modeling using VSP data. The present disclosure provides a new approach to determine VTI parameters in acoustic media using a simplifying approximation for the elastic wave equation. Specifically, the illustrative methods described herein use pseudo-acoustic equations which eliminate or substantially eliminate the contribution from shear waves, and thus significantly reducing the time needed to perform inversion. Thus, the methods disclosed herein provide workflows for performing full waveform inversion, including direct P wave and reflected P wave arrivals, to provide velocity models used to generate seismic images with high quality and resolution.

In a generalized method of the present disclosure, a velocity model of a subsurface formation is generated by obtaining VSP field data, and a trial velocity model of a subsurface formation is generated. A pseudo-acoustic wave equation is applied to the trial velocity model to generate a synthetic dataset which matches an acquisition geometry of the VSP field data. Thereafter, a final velocity model is generated using the synthetic dataset. The final velocity model may then be used to perform a variety of downhole operations or analyses such as, for example, drilling of a wellbore.

Borehole seismic surveys have the capability to record high frequency data in a low noise environment. The surveys can resolve thin layering and poorly imaged areas, such as subsalt imaging, better than surface seismic surveys. Conventional velocity model generation methods for VSP methods like semblance or ray-based tomography, for example, fail to provide high fidelity images or recover accurate subsurface parameters.

Therefore, as described herein, illustrative embodiments and methods of the present disclosure perform full-waveform modeling in order to ensure use of the all information contained in the subsurface data. Full-waveform inversion ("FWI") is a non-linear data-fitting technique which generates high-resolution velocity models of the subsurface. FWI uses a nonlinear gradient based local optimization approach that iteratively matches the simulated data with raw field data. FWI has been successfully applied to surface seismic data for accurate parameter estimation in complex media. However, the implementation of FWI to walkaway VSP data has been focused on anisotropic elastic and viscoelastic media. The current disclosure applies a simplifying method which simulates the effect of an anisotropic media while not specifically modeling the shear wave data. As such, it is called a "pseudo-acoustic" modeling method. Thus, as used herein, pseudo-acoustic refers to those formulations which eliminate or substantially eliminate shear wave contributions. In certain pseudo-acoustic applications described herein, some weak shear wave artifacts may still be generated in non-elliptical (epsilon not equal to delta) cases. However, in isotropic and elliptical (epsilon equal to delta) cases, there are no shear wave artifacts.

Figure 1:
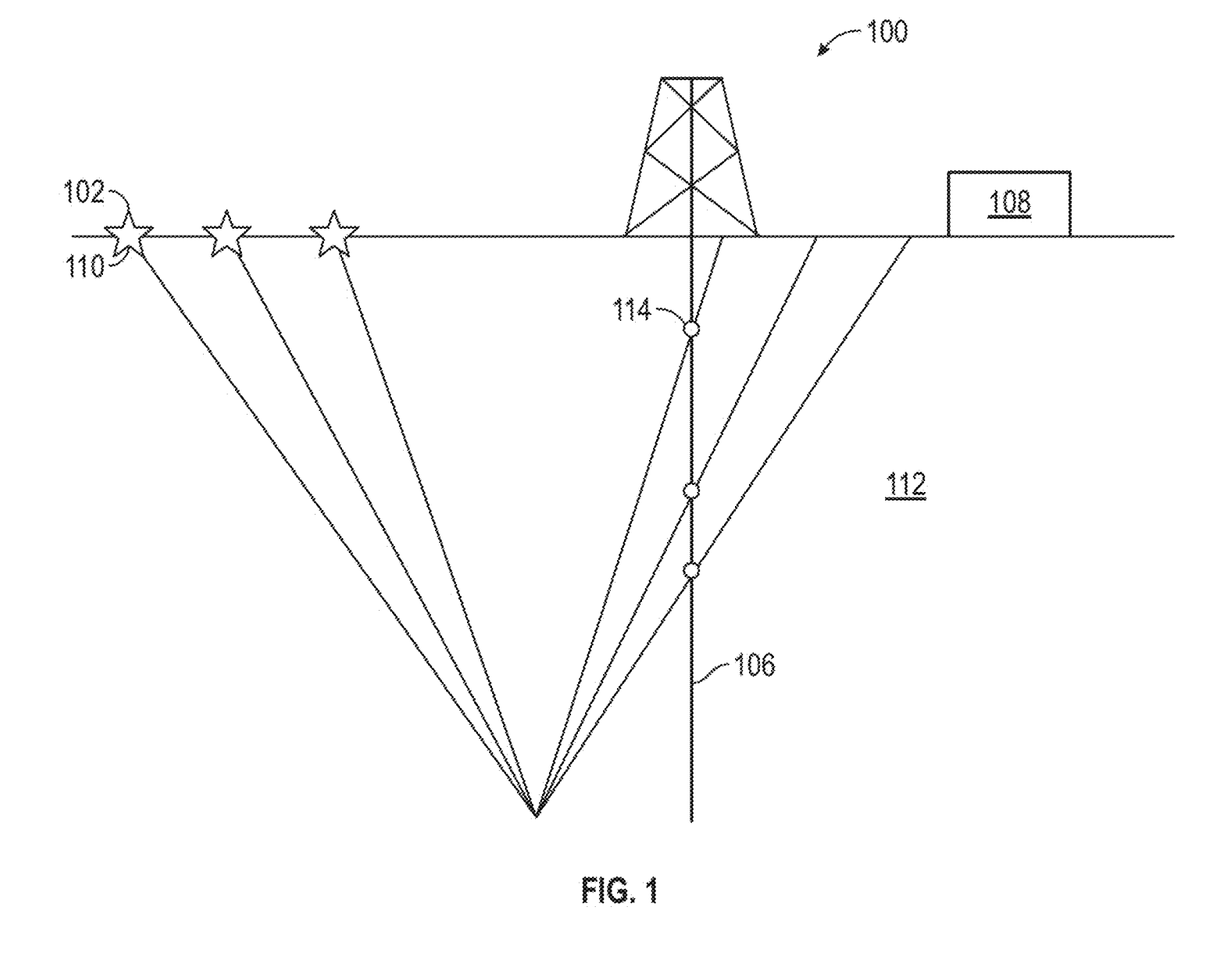
FIG. 1 is a schematic diagram showing a cross-sectional view of an illustrative environment with seismic sources, seismic receivers, a wellbore and a computing system, according to certain embodiments of the present disclosure.

FIG. 1 is a schematic diagram showing a cross-sectional view of an illustrative VSP environment 100 used to obtain VSP field data, according to certain illustrative methods of the present disclosure. VSP environment 100 includes seismic sources 102, wellbore 106 and a computing system 108. The energy (e.g., acoustic wave) 110 from one or more seismic sources 102 at or near the surface travels through the subsurface formation 112, reflects off of various subterranean formations or geological features, and is subsequently collected as VSP field data within the wellbore 106 using wellbore receivers 114. For certain embodiments of the present disclosure, subterranean formation 112 can be anisotropic, i.e., propagation speed of acoustic waves may depend on the direction in which the acoustic wave propagates.

In accordance with embodiments of the present disclosure, computing system 108 may be configured to acquire VSP data associated with the subterranean formation 112 from wellbore receivers 114, generate the velocity models as described herein, and perform estimation of anisotropy parameters of the subterranean formation 112. In one or more embodiments, computing system 108 may be further configured to utilize the calculated anisotropy parameters of subterranean formation 112 to generate depth images and an accurate seismic data volume associated with the subterranean formation 112. For certain embodiments, the obtained depth images and the accurate seismic data volume of subterranean formation 112 obtained by taking into account anisotropy parameters of subterranean formation 112 may be utilized in real time for drilling of wellbore 106. In general, the presented illustrative methods for generating velocity models using pseudo-acoustic modeling may be used to obtain more coherent depth images of hydrocarbon reservoirs in the subterranean formations leading to more efficient drilling of wellbores and increased hydrocarbon production.

In view of the foregoing, the theory underlying the methods herein will now be described. Wave field reconstruction in a transverse isotropic ("TI") media, which can be either VTI, horizontal TI ("HTI"), or transverse TI ("TTI"), is provided by a system of two second-order coupled equations. If a VTI assumption is imposed and the shear waves are ignored by setting $V_{s0}=0$, the pseudo-acoustic wave propagation may be expressed as:

$$\frac{\partial^2 u_p}{\partial t^2} = V_{hor}^2 \frac{\partial^2 u_p}{\partial x^2} + V_{p0}^2 \frac{\partial^2 u_q}{\partial z^2}, \text{ and} \qquad \text{Eq. 1}$$

$$\frac{\partial^2 u_q}{\partial t^2} = V_{nmo}^2 \frac{\partial^2 u_p}{\partial x^2} + V_{p0}^2 \frac{\partial^2 u_q}{\partial z^2}, \qquad \text{Eq. 2}$$

where $V_{hor}=V_{nmo}\sqrt{1+2\eta}=V_{p0}\sqrt{1+2\in}$ is the P-wave horizontal velocity. Both the p- and q-components of the wave field contain a P-wave with the correct kinematics and a shear-wave "artifact" caused by setting the S-wave vertical velocity to zero. Thus, Equations 1 and 2 are the pseudo-acoustic equations in this illustrative embodiment.

The matrix form of VTI-coupled equations is:

$$\begin{bmatrix} V_{hor}^2 \partial_{xx} - \partial_{tt} & V_{p0}^2 \partial_{zz} \\ V_{nmo}^2 \partial_{xx} & V_{p0}^2 \partial_{zz} - \partial_{tt} \end{bmatrix} \begin{bmatrix} u_p \\ u_q \end{bmatrix} - \begin{bmatrix} f_p \\ f_q \end{bmatrix} = 0, \qquad \text{Eq. 3}$$

where $u_p$ and $u_q$ are the p and q forward-propagated wave field variables, and $f_p$ and fore the p and q source terms, respectively. In certain illustrative methods of the present disclosure, the adjoint wave field can be evaluated by computing the adjoint of the above equation:

$$\begin{bmatrix} V_{hor}^2 \partial_{xx} - \partial_{tt} & V_{nmo}^2 \partial_{xx} \\ V_{p0}^2 \partial_{zz} & V_{p0}^2 \partial_{zz} - \partial_{tt} \end{bmatrix} \begin{bmatrix} a_p \\ a_q \end{bmatrix} - \begin{bmatrix} d_p \\ d_q \end{bmatrix} = 0, \qquad \text{Eq. 4}$$

where $a_p$ and $a_q$ are the p and q adjoint wavefield variables and $d_p$ and $d_q$ are the p and q source terms for adjoint equations, respectively.

The adjoint-state method described herein may be applied in a variety of ways. The adjoint-state method provides an efficient way of computing the derivatives of an objective function with respect to the model parameters. In certain illustrative methods, the components of the adjoint-state method are the objective function, state equations, and adjoint equations. The objective function depends on the model parameters obtained using the state equations, which represent the forward-modeling equations used in the pseudo-acoustic formulations, as will be discussed below. The adjoint-state method involves four main steps: (i) computation of the state variables (i.e., forward wave field given by u) by solving the state equations; (ii) computation of the adjoint source functions ($d_1$); (iii) computation of the adjoint-state variable (e.g., adjoint wave field given by λ) by solving the adjoint equations; and (iv) computation of the gradient of the objective function.

Thus, in certain methods, the FWI method can be posed as an optimization problem using the Lagrangian function which may be formulated as:

$$\Lambda(m,u,\lambda)=J-<F,\lambda>,  \quad \text{Eq. 5,}$$

where Λ is the Lagrangian function, m represents the model parameters, u is the state variable, λ is the adjoint variable, J is the objective function, and F is the state equation for the forward-modeled wavefield, and:

$$2J=(d_{obs}-d_{pre})^T W_d (d_{obs}-d_{pre})+(m_i-m_{prior})^T W_m(m_i-m_{prior}) \quad \text{Eq. 6,}$$

which is the objective function to be minimized. It may be noted here that the objective function J could also take other forms such as a correlation between field data and simulated data. In fact a correlation objective is more useful in case of FWI since correlation places importance on matching the phase of the seismic signal. A correlation-based objective function can be written as:

$$J = \frac{d_{obs}}{\|d_{obs}\|} \cdot \frac{d_{pre}}{\|d_{pre}\|} \quad \text{Eq. 7}$$

The function F in Eq. 5 is the state equation for the forward-modeled wave field. The model vector for the problem may be defined as m={$V_{p0}$; ∈; δ}. Alternatively, the model vector can be defined using rearrangements of the model parameters in m. A viable alternative is m={$V_{p0}$; $V_{hor}$; $V_{nmo}$}.

The gradient computation (i.e., sensitivity kernel) may be achieved in a variety of ways. In one illustrative method, the state-variable and adjoint-state variable calculated above in steps (i) and (iii), respectively, serve as inputs to the gradient computation. The sensitivity kernel for a particular model parameter is the response in the model space to the data perturbations for a single source and a single receiver. The sensitivity kernel describes the model areas that can provide updates for a particular receiver location. For our problem, the sensitivity kernel is the zero lag cross-correlation of the source wave field with the adjoint wave field. The data residuals are back-propagated along the "banana-doughnut" kernel to generate the sensitivity kernel.

Figure 2:
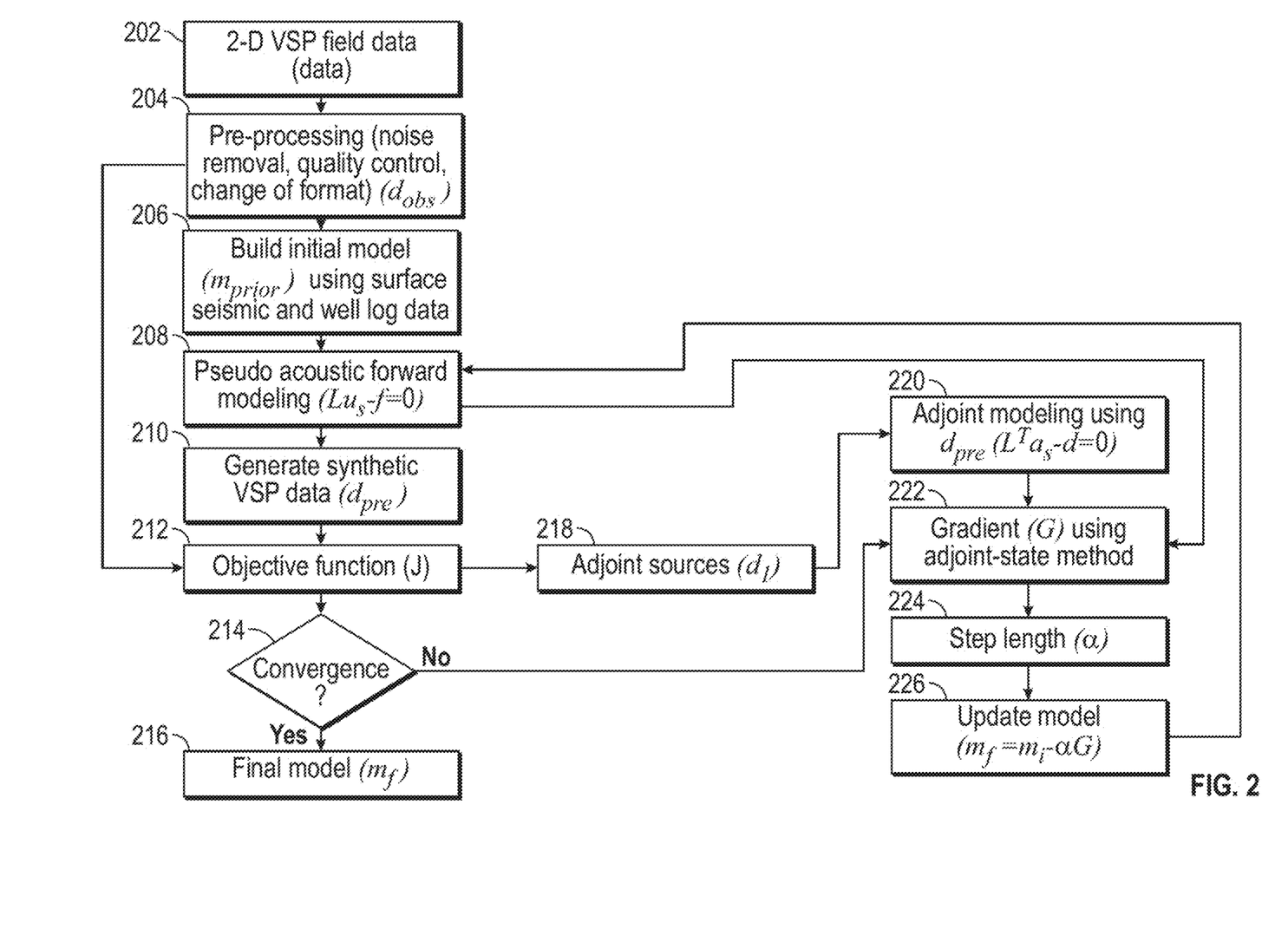
FIG. 2 illustrates a flow chart of a workflow 200 for generating a VTI velocity model of a subsurface formation, according to certain illustrative methods of the present disclosure.

In view of the foregoing theory, illustrative embodiments and methods of the present disclosure extend acoustic FWI from surface seismic to VSP data for VTI media using the adjoint state method. A primary focus of the adjoint state method is the efficient computation of gradients of an objective function with respect to the model parameters $V_{p0}$, ∈, and δ or alternatively $V_{p0}$, $V_{hor}$ and $V_{nmo}$. $V_{p0}$ is the P-wave velocity, while ∈, and δ are the Thomsen parameters. $V_{hor}$ and $V_{nmo}$ have been defined earlier in the section on pseudo-acoustic wave equation. To demonstrate the method, synthetic data from a4 layered model is used with a VTI background while applying a reverse VSP geometry. FIG. 2 illustrates a flow chart of a workflow 200 for generating a VTI velocity model of a subsurface formation, according to certain illustrative methods of the present disclosure. With reference to FIGS. 1 and 2, at block 202, VSP field data is acquired using, for example, a walk way VSP or a 3D data VSP survey such as that illustrated in FIG. 1.

At block 204, computing system 108 preprocessing the VSP field data. In certain methods, the data, $d_{obs}$, is prepared by performing functions such as, for example, noise removal, quality control, change of format, 3c rotation, etc. At block 206, an initial (or trial) VTI velocity model, $m_t$, is generated. The initial velocity model may be the first in time model or some intervening iteration before the final velocity model is generated. Thus, "trial" velocity model as used herein could refer to any model except the final velocity model. However, the true first in time velocity model is generated using, for example, well log, surface seismic derived velocities, or zero offset (when the source is located near the well head) VSP velocities. As will be described below, subsequent trial velocity models are iteratively updated using the methods of the present disclosure until a desired convergence is achieved.

At block 208, forward modeling is performed using the pseudo-acoustic forward modeling Equations 1 and 2 described above. As previously stated, the pseudo-acoustic equations described herein eliminate or substantially eliminate contributions from shear waves. Using the pseudo-acoustic forward modeling formations, a set of synthetic data is created using the trial velocity model. In certain illustrative methods, the synthetic dataset matches the acquisition geometry of the field VSP dataset. Here, the equation $Lu_s-f=0$ refers to the forward modeling wave equation, and $u_s$ is the source term which is composed of both $u_p$ and $u_q$ (from above).

At block 210, computer system 108 extracts synthetic VSP data (i.e., synthetic seismic traces) from the synthetic dataset. In certain methods, the extracted synthetic VSP data $d_{pre}$ matches the geometry of the VSP field data. At block 212, adjoint modeling is performed. Here, computer system 108 first calculates the adjoint sources $d_i$ using, for example, the Lagrangian function to compute the adjoint sources which depends on the VSP field data (from block 204) and the synthetic VSP data acquired using the objective function. Also at block 212, adjoint modeling is used to back propagate the adjoint sources using the trial velocity model. The equation $L^T a_s-d_1=0$ refers to the adjoint modeling wave equation where $a_s$ is the adjoint field which is composed of both $a_p$ and $a_q$ (from above).

At block 214 [PLEASE DESCRIBE "DATA RESIDUAL" OF BLOCK 214]. At block 216, the trial velocity model is deemed converged if the termination criteria has been met, such as, for example, the number of iterations has been achieved or the minimization error is small enough. Here, computer system compares the synthetic data of the trial velocity model to the VSP field datasets to determine the convergence of the two using the criteria in block 216 (i.e., the objective function of Eq. 6 or Eq. 7 above). If the criteria has been met, the results have converged, and the current trial model is saved as the final model, $m_f$, and the iteration is stopped at block 218. If, however, the criteria of the objective function has not been met, the results have not converged, and (at block 220) computer system 108 performs gradient computations to determine the sensitivity of the results due to small changes in the trial velocity model parameters. The gradient calculations are performed using adjoint modeling of block 212, along with the pseudo-acoustic modeling of block 208. In certain methods, this process includes performing a zero lag correlation computation of the corresponding wave field snap shots, which are summed along the time axis, creating the gradient for each model parameter in the grid.

At block 222, computer system 108 alters the step length a which controls the amount of correction or adjustment to each model parameter as the trial model converges to the true model (for which the VSP field data and the modeled data also converge). At block 224, the initial/trial model is updated accordingly using the step length along the gradient direction. The equation $m_{i+1}=m_i-\alpha G$ refers to the model updating equation for each iteration, i, where m is the model parameter, alpha is the step length, and G is the gradient. Thus, blocks 222 and 224 achieves the FWI. The method then loops back to block 206, where the initial/trial model is iteratively updated until the desired convergence is achieved. Once the final VTI velocity model has been generated, any variety of downhole operations may be conducted accordingly, including drilling of a wellbore.

Figure 3:
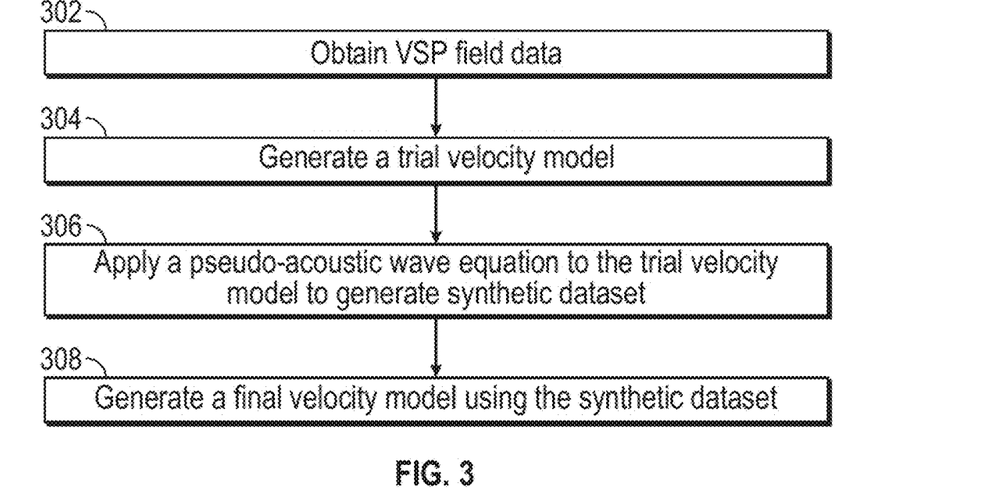
FIG. 3 illustrates a generalized flow chart of a workflow 300 for generating a velocity model of a subsurface formation, according to certain illustrative methods of the present disclosure.

FIG. 3 illustrates a generalized flow chart of a workflow 300 for generating a velocity model of a subsurface formation, according to certain illustrative methods of the present disclosure. At block 302, VSP field data is obtained using, for example, the environment of FIG. 1. At block 304, a trial velocity model is generated of a subsurface formation. AT block 306, a pseudo-acoustic wave equation is applied to the trial velocity model to thereby generate a synthetic dataset. After one or more iterations as defined herein, at block 308, a final velocity model is generated using the synthetic dataset.

Figure 4:
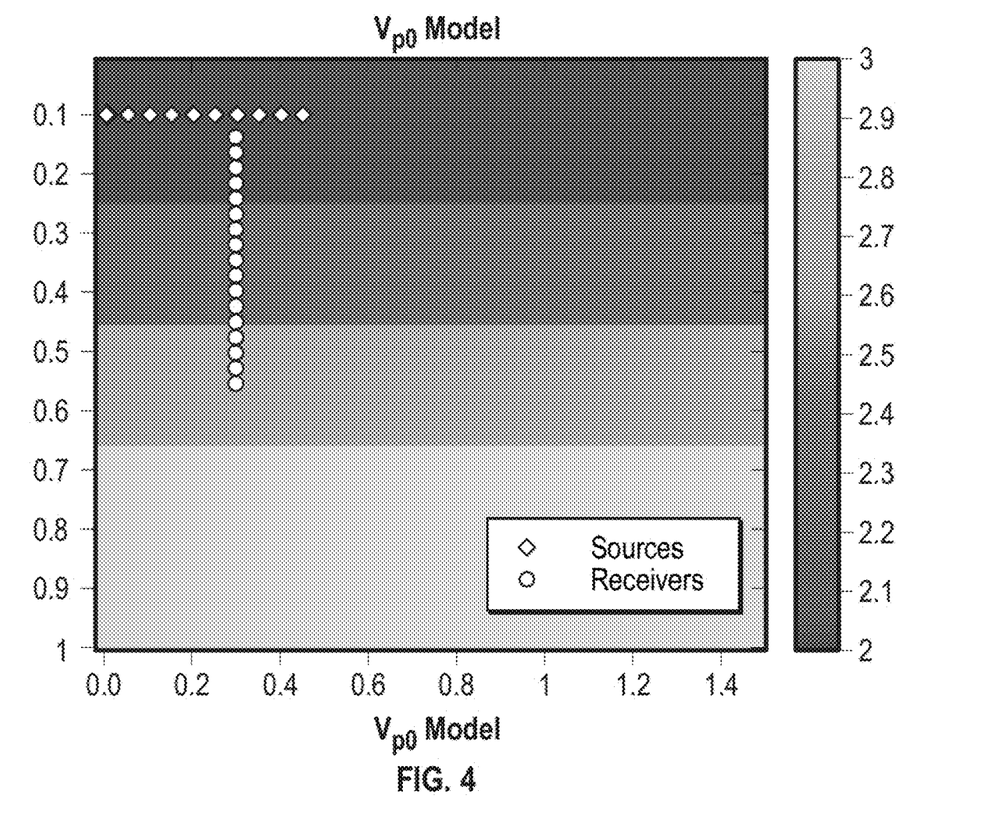
FIG. 4 illustrates a four-layered VTI model used to test embodiments of the present disclosure.

Methods of the present disclosure were tested on a four-layered VTI model, as the one illustrated in FIG. 4. The horizontal and vertical grid spacing is 10 m. The data is created by 10 sources positioned at 50 m intervals at 100 m depth from the surface and the 45 receivers record inside the borehole with 10 m intervals. The source signal is a Ricker wavelet with a central frequency of 15 Hz. As explained above with regard to the adjoint state method, forward and adjoint modeling must be conducted.

Figure 5A:
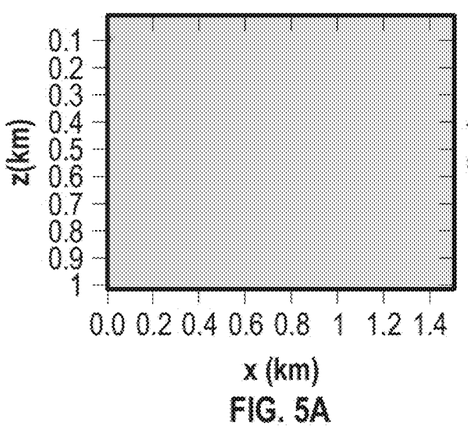
FIGS. 5A, 5B, 5C, 5D, 5E, 5F, 5G, 5H, 5I, and 5J show pairs of snapshots of the wave fields acquired testing embodiments of the present disclosure.
Figure 5B:
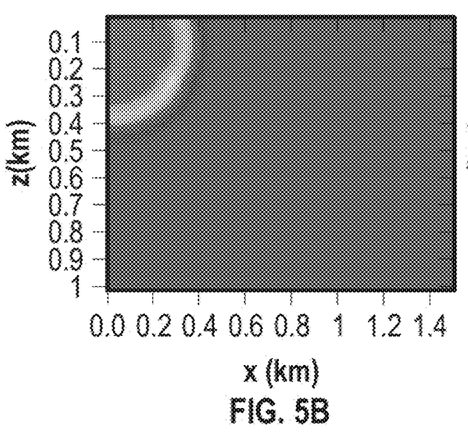
Figure 5C:
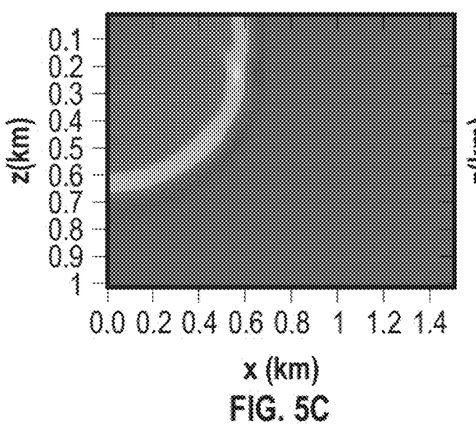
Figure 5D:
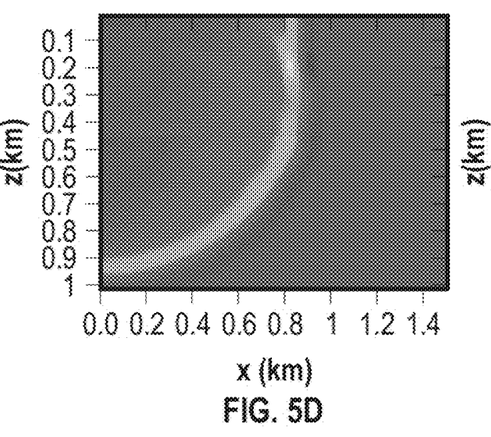
Figure 5E:
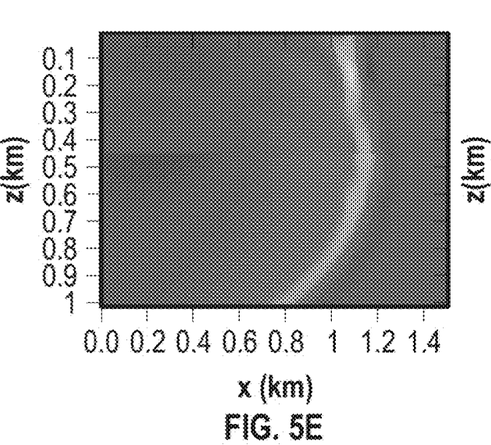
Figure 5F:
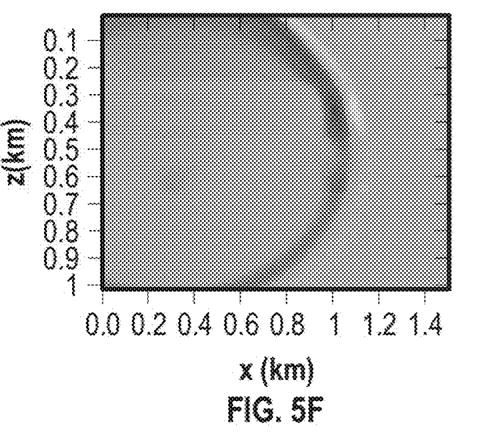
Figure 5G:
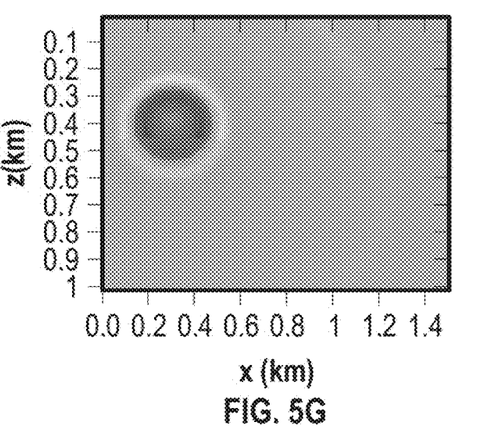
Figure 5H:
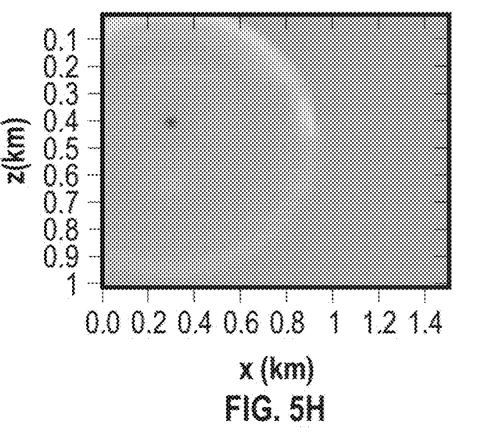

FIGS. 5A-5J show pairs of snapshots of the wave fields. FIGS. 5(a), (b), (c), (d) and (e) show source wave fields propagated from a source located at 100 m depth from the surface, while FIGS. 5(f), (g), (h), (i) and (j) show adjoint wave fields propagated for receiver located at 300 m in horizontal direction and 400 m from the surface. More specifically, the left panel in each row shows the pseudo-acoustic forward modeled wave field from the top source in FIG. 4, at several different time steps, until a maximum time of Tmax=0.5 seconds. So panel 5(a) is at zero time, and each of the other panels (FIGS. 5(b), 5(c), 5(d), 5(e)) are at later time steps. The trace corresponding to the receiver at x=0.3 km is recorded. Next for the adjoint modeling, the time reversed trace is injected into the model at the receiver location. The right panels (FIGS. 5(f), 5(g), 5(h), 5(i), 5(j)) show snapshots of the back propagated (adjoint) wave field. FIG. 5(e) shows the forward modeled snapshot at time Tmax, which is the time the forward modeling is stopped.

Figure 5I:
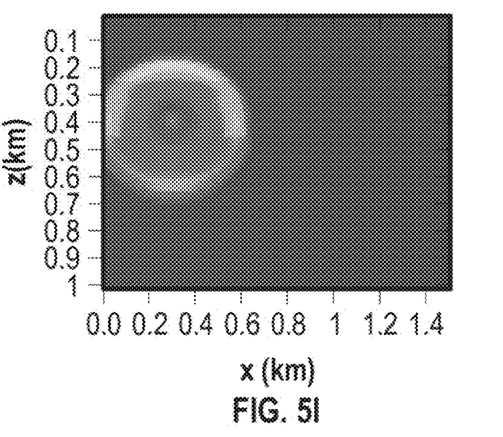
Figure 5J:
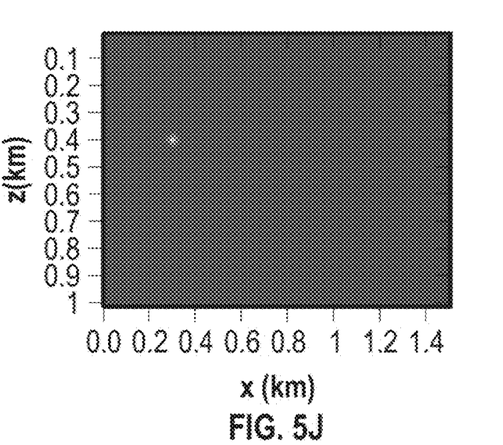

FIG. 5(j) is the snapshot when the time reversed trace is first injected into the model at the receiver location. Since the wave field is back propagated, this snapshot (FIG. 5(j)) corresponds to the same time, Tmax, as the snapshot in FIG. 5(e). The wave field is then back propagated and snapshots of the wave field are shown in FIGS. 5(i), (h), (g), and (f), which correspond to the times in FIGS. 5(d), (c), (b), and (a), respectively.

Figure 6A:
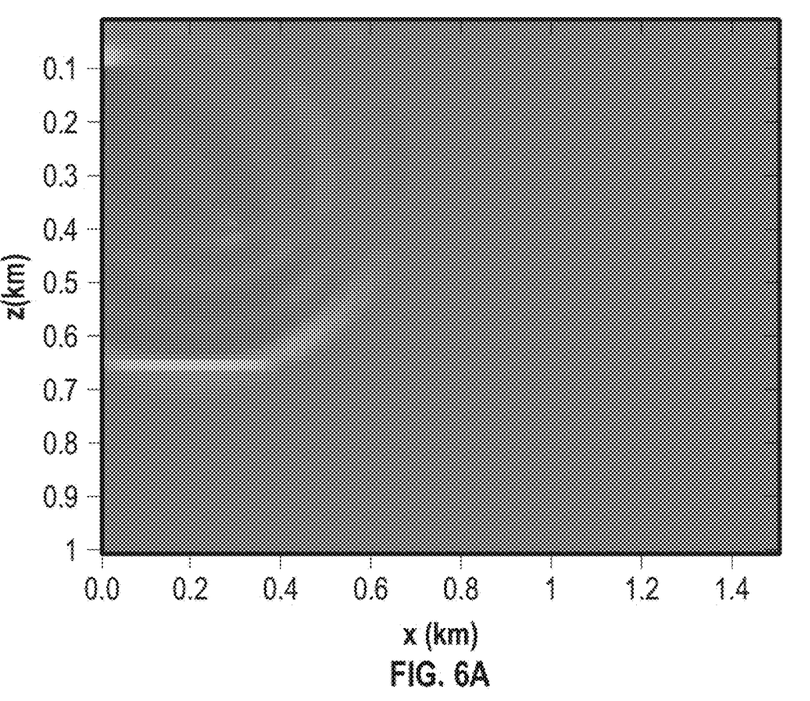
FIGS. 6A, 6B, and 6C show the computed gradient (i.e., computation of the gradient of the objective function) of the adjoint state method.
Figure 6B:
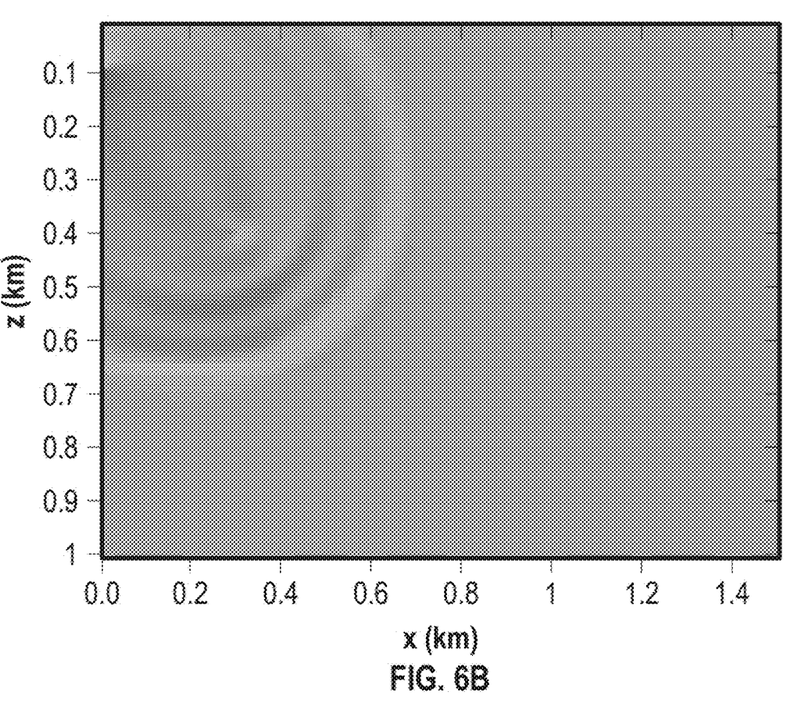
Figure 6C:
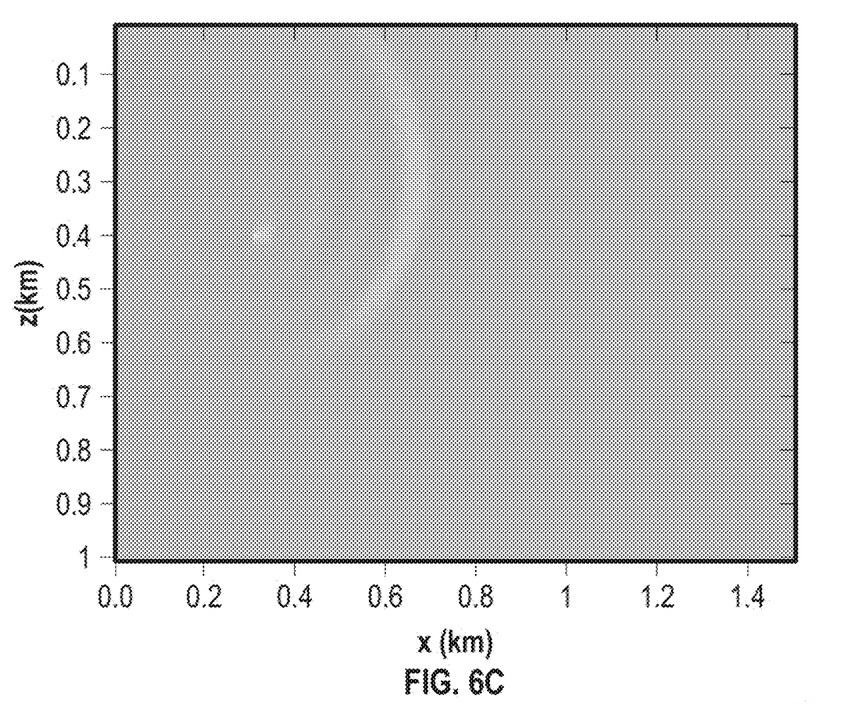

FIGS. 6A-C show the computed gradients (i.e., computation of the gradient of the objective function) of the adjoint state method described above. More specifically, it shows the gradient of $V_{p0}$, $V_{nmo}$, $V_{hor}$ for a source located at 100 m depth and receiver located at 400 m depth and 300 m in horizontal direction. In order to find the global minima of the objective function, the systems computes the correct gradient for all of the model parameters $\{V_{p0}; V_{nmo}; V_{hor}\}$ or alternatively $\{V_{p0}; \in; \delta\}$. In FIG. 6A, the $V_{p0}$ gradient illuminated mostly the near vertical regions since the gradient depends on the vertical wavenumber component of the model. However, In FIG. 6C, the $V_{hor}$ gradient illuminated mostly the far offset regions since the gradient depends on the horizontal wavenumber component of the model. In FIG. 6B, the $V_{nmo}$ gradient illuminated both the near vertical and horizontal regions since the gradient depends on both the vertical and horizontal wavenumber components of the model. These are then used in the inversion process to derive updates to the model parameters, thereby ultimately resulting in the final velocity model.

Figure 7:
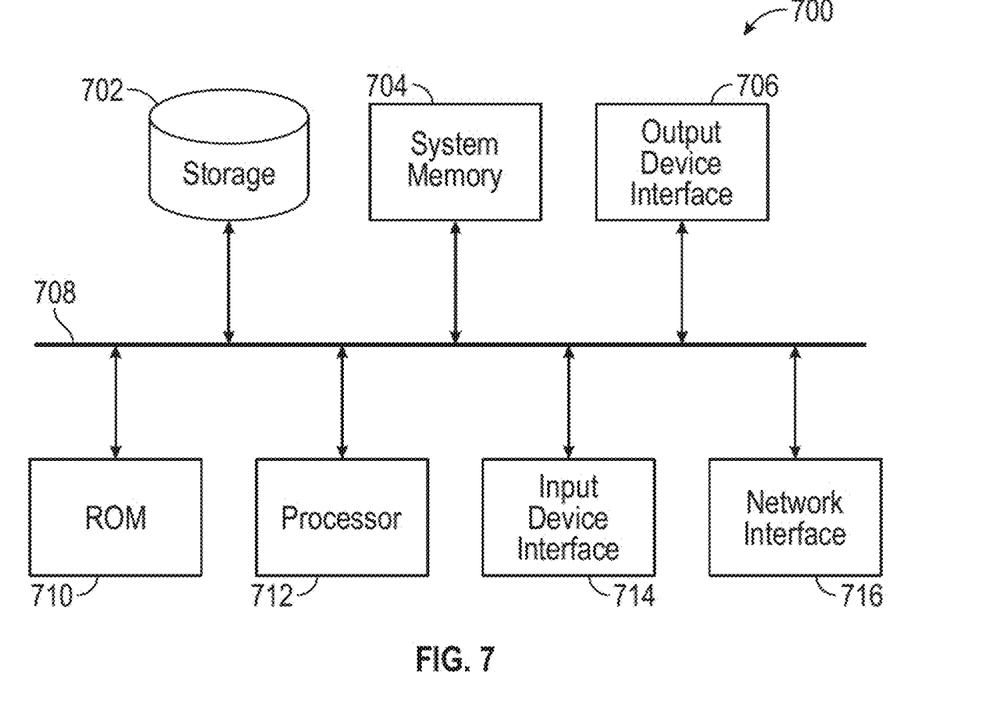
FIG. 7 is a block diagram of an illustrative computing system in which embodiments of the present disclosure may be implemented adapted for pseudo-acoustic anisotropic parameter estimation.

FIG. 7 is a block diagram of an illustrative computing system 700 (also illustrated in FIG. 1 as computing system 108) in which embodiments of the present disclosure may be implemented adapted for pseudo-acoustic anisotropic parameter estimation. For example, operations of the workflow 200 or 300, as described above, may be implemented using the computing system 700. The computing system 700 can be a computer, phone, personal digital assistant (PDA), or any other type of electronic device. Such an electronic device includes various types of computer readable media and interfaces for various other types of computer readable media. As shown in FIG. 7, the computing system 700 includes a permanent storage device 702, a system memory 704, an output device interface 706, a system communications bus 708, a read-only memory (ROM) 710, processing unit(s) 712, an input device interface 714, and a network interface 716.

The bus 708 collectively represents all system, peripheral, and chipset buses that communicatively connect the numerous internal devices of the computing system 700. For instance, the bus 708 communicatively connects the processing unit(s) 712 with the ROM 710, the system memory 704, and the permanent storage device 702. From these various memory units, the processing unit(s) 712 retrieves instructions to execute and data to process in order to execute the processes of the subject disclosure. The processing unit(s) can be a single processor or a multi-core processor in different implementations.

In this example, ROM 710 stores static data and instructions that are needed by the processing unit(s) 712 and other modules of the computing system 700. The permanent storage device 702, on the other hand, is a read-and-write memory device. This device is a non-volatile memory unit that stores instructions and data even when the computing system 700 is off. Some implementations of the subject disclosure use a mass-storage device (such as a magnetic or optical disk and its corresponding disk drive) as the permanent storage device 702.

The bus 708 also connects to the input and output device interfaces 714 and 706. The input device interface 714 enables the user to communicate information and select commands to the computing system 700. Input devices used with the input device interface 714 include, for example, alphanumeric, QWERTY, or T9 keyboards, microphones, and pointing devices (also called "cursor control devices"). The output device interfaces 706 enables, for example, the display of images generated by the computing system 700. Output devices used with the output device interface 706 include, for example, printers and display devices, such as cathode ray tubes (CRT) or liquid crystal displays (LCD).

Some implementations include devices such as a touchscreen that functions as both input and output devices.

Also, as shown in FIG. 7, the bus 708 also couples the computing system 700 to a public or private network (not shown) or combination of networks through a network interface 716. Such a network may include, for example, a local area network ("LAN"), such as an Intranet, or a wide area network ("WAN"), such as the Internet. Any or all components of the computing system 700 can be used in conjunction with the subject disclosure.

Accordingly, the embodiments and methods described herein provide high resolution velocity models for vertically transverse isotropic media and subsequently generate better focused subsurface images in contrast to conventional techniques. This disclosure provides a new tool to determine the anisotropic parameters of the acoustic VTI media and subsequently characterize the reservoir. In case of thin layering or poorly illuminated areas like subsalt, where surface seismic data fails to provide satisfactory velocity models, these methods can calibrate surface seismic data.

Moreover, methods described herein apply pseudo-acoustic wave formulations which allow for much faster computation and convergence in comparison to conventional approaches. Also, use of the objective functions described herein, which has fewer local minima when compared to conventional approaches, provide a more accurate update giving a faster convergence. In addition, the use of the adjoint state method allows methods of the disclosure to compute the entire gradient in only two modeling iterations.

Embodiments described herein further relate to any one or more of the following paragraphs:

1. A method for generating a velocity model of a subsurface formation, the method comprising obtaining vertical seismic profile ("VSP") field data; generating a trial velocity model of a subsurface formation; applying a pseudo-acoustic wave equation to the trial velocity model to thereby generate a synthetic dataset which matches an acquisition geometry of the VSP field data; and generating a final velocity model using the synthetic dataset.

2. A method as defined in paragraph 1, wherein the trial and final velocity models are vertical transverse isotropic ("VTI") models.

3. A method as defined in paragraphs 1 or 2, wherein generating the final velocity model comprises extracting synthetic VSP data from the synthetic dataset, wherein the synthetic VSP data matches the acquisition geometry of the VSP field data; comparing the synthetic VSP data to the VSP field data; and converging the synthetic VSP data and the VSP field data, thereby generating the final velocity model.

4. A method as defined in any of paragraphs 1-3, wherein the synthetic VSP data and the VSP field data are compared using an objective function.

5. A method as defined in any of paragraphs 1-4, wherein converging the synthetic VSP data and the VSP field data comprise performing gradient computations on the trial velocity model.

6. A method as defined in any of paragraphs 1-5, further comprising updating the trial velocity model using an adjoint modeling technique.

7. A method as defined in any of paragraphs 1-6, wherein the adjoint modeling technique is applied to back propagate adjoint sources into the trial velocity model.

8. A method as defined in any of paragraphs 1-7, wherein the first velocity model is updated using a full waveform inversion ("FWI") technique.

9. A method as defined in any of paragraphs 1-8, wherein the trial velocity model is generated using at least one of well log data, surface seismic derived velocity data, and zero offset VSP velocity data.

10. A method as defined in any of paragraphs 1-9, further comprising performing a drilling operation using the final velocity model.

11. A system for generating a velocity model of a subsurface formation, the system comprising at least one processor; and a memory coupled to the processor having instructions stored therein, which when executed by the processor, cause the processor to perform operations comprising: obtaining vertical seismic profile ("VSP") field data; generating a trial velocity model of a subsurface formation; applying a pseudo-acoustic wave equation to the trial velocity model to thereby generate a synthetic dataset which matches an acquisition geometry of the VSP field data; and generating a final velocity model using the synthetic dataset.

12. A system as defined in paragraph 11, wherein the trial and final velocity models are vertical transverse isotropic ("VTI") models.

13. A system as defined in paragraphs 11 or 12, wherein generating the final velocity model comprises extracting synthetic VSP data from the synthetic dataset, wherein the synthetic VSP data matches the acquisition geometry of the VSP field data; comparing the synthetic VSP data to the VSP field data; and converging the synthetic VSP data and the VSP field data, thereby generating the final velocity model.

14. A system as defined in any of paragraphs 11-13, wherein the synthetic VSP data and the VSP field data are compared using an objective function.

15. A system as defined in any of paragraphs 11-14, wherein converging the synthetic VSP data and the VSP field data comprise performing gradient computations on the trial velocity model using the adjoint-state method.

16. A system as defined in any of paragraphs 11-15, further comprising updating the trial velocity model using either a regularization based objective function or a correlation-based objective function.

17. A system as defined in any of paragraphs 11-16, wherein the adjoint modeling technique is applied to back propagate adjoint sources into the trial velocity model.

18. A system as defined in any of paragraphs 11-17, wherein the first velocity model is updated using a full waveform inversion ("FWI") technique.

19. A system as defined in any of paragraphs 11-18, wherein the trial velocity model is generated using at least one of well log data, surface seismic derived velocity data, and zero offset VSP velocity data.

20. A system as defined in any of paragraphs 11-19, further comprising performing a drilling operation using the final velocity model.

21. A non-transitory computer-readable storage medium having instructions stored therein, which when executed by a computer, cause the computer to perform any one of the methods of paragraphs 1-10.

Furthermore, any the illustrative methods described herein may be implemented by a system comprising processing circuitry or a non-transitory computer readable medium comprising instructions which, when executed by at least one processor, causes the processor to perform any of the methods described herein.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method for generating a velocity model of a subsurface formation, the method comprising:
obtaining vertical seismic profile ("VSP") field data;
inverting the VSP field data using a pseudo-acoustic wave equation, wherein the inversion comprises:
generating a trial velocity model of a subsurface formation;
applying the pseudo-acoustic wave equation to the trial velocity model to thereby generate a synthetic dataset which matches an acquisition geometry of the VSP field data, wherein the pseudo-acoustic wave equation does not include shear wave vertical velocity $V_{S0}$; and
generating a final velocity model using the synthetic dataset, wherein generating the final velocity model comprises:
extracting synthetic VSP data from the synthetic dataset, wherein the synthetic VSP data matches the acquisition geometry of the VSP field data;
comparing the synthetic VSP data to the VSP field data; and
converging the synthetic VSP data and the VSP field data, thereby generating the final velocity model; and
generating subsurface images using the final velocity model.

2. A method as defined in claim 1, wherein the trial and final velocity models are vertical transverse isotropic ("VTI") models.

3. A method as defined in claim 1, wherein the synthetic VSP data and the VSP field data are compared using an objective function.

4. A method as defined in claim 3, wherein the objective function can be a correlation based objective function or a regularization based objective function.

5. A method as defined in claim 1, wherein converging the synthetic VSP data and the VSP field data comprise performing gradient computations on the trial velocity model.

6. A method as defined in claim 1, further comprising updating the trial velocity model using an adjoint modeling technique.

7. A method as defined in claim 6, wherein:
the adjoint modeling technique is applied to back propagate adjoint sources using the trial velocity model; or
the trial velocity model is updated using a full waveform inversion ("FWI") technique.

8. A method as defined in claim 1, wherein the trial velocity model is generated using at least one of well log data, surface seismic derived velocity data, and zero offset VSP velocity data.

9. A method as defined in claim 1, further comprising performing a drilling operation using the final velocity model.

10. A system for generating a velocity model of a subsurface formation, the system comprising:
at least one processor; and
a memory coupled to the processor having instructions stored therein, which when executed by the processor, cause the processor to perform operations comprising:
obtaining vertical seismic profile ("VSP") field data;
inverting the VSP field data using a pseudo-acoustic wave equation, wherein the inversion comprises:
generating a trial velocity model of a subsurface formation;
applying a pseudo-acoustic wave equation to the trial velocity model to thereby generate a synthetic dataset which matches an acquisition geometry of the VSP field data, wherein the pseudo-acoustic wave equation does not include shear wave vertical velocity $V_{S0}$; and
generating a final velocity model using the synthetic dataset, wherein generating the final velocity model comprises:
extracting synthetic VSP data from the synthetic dataset, wherein the synthetic VSP data matches the acquisition geometry of the VSP field data;
comparing the synthetic VSP data to the VSP field data; and
converging the synthetic VSP data and the VSP field data, thereby generating the final velocity model; and
generating subsurface images using the final velocity model.

11. A system as defined in claim 10, wherein the trial and final velocity models are vertical transverse isotropic ("VTI") models.

12. A system as defined in claim 10, wherein the synthetic VSP data and the VSP field data are compared using an objective function.

13. A system as defined in claim 10, wherein converging the synthetic VSP data and the VSP field data comprise performing gradient computations on the trial velocity model.

14. A system as defined in claim 10, further comprising updating the trial velocity model using an adjoint modeling technique.

15. A system as defined in claim 14, wherein:
the adjoint modeling technique is applied to back propagate adjoint sources using the trial velocity model; or
the trial velocity model is updated using a full waveform inversion ("FWI") technique.

16. A system as defined in claim 10, wherein the trial velocity model is generated using at least one of well log data, surface seismic derived velocity data, and zero offset VSP velocity data.

17. A system as defined in claim 10, further comprising performing a drilling operation using the final velocity model.

18. A non-transitory computer-readable storage medium having instructions stored therein, which when executed by a computer, cause the computer to perform the method comprising:
obtaining vertical seismic profile ("VSP") field data;
inverting the VSP field data using a pseudo-acoustic wave equation, wherein the inversion comprises:
generating a trial velocity model of a subsurface formation;
applying a pseudo-acoustic wave equation to the trial velocity model to thereby generate a synthetic dataset which matches an acquisition geometry of the VSP field data, wherein the pseudo-acoustic wave equation does not include shear wave vertical velocity $V_{S0}$; and
generating a final velocity model using the synthetic dataset, wherein generating the final velocity model comprises:

extracting synthetic VSP data from the synthetic dataset, wherein the synthetic VSP data matches the acquisition geometry of the VSP field data;

comparing the synthetic VSP data to the VSP field data; and converging the synthetic VSP data and the VSP field data, thereby generating the final velocity model; and generating subsurface images using the final velocity model.

19. A storage medium as defined in claim 18, wherein the synthetic VSP data and the VSP field data are compared using an objective function.

20. A storage medium as defined in claim 18, wherein the trial velocity model is generated using at least one of well log data, surface seismic derived velocity data, and zero offset VSP velocity data.

\* \* \* \* \*